March 19, 1946. G. E. MERRITT ET AL 2,397,031
CONTINUOUS STRIP CAMERA
Filed June 12, 1943   5 Sheets-Sheet 1
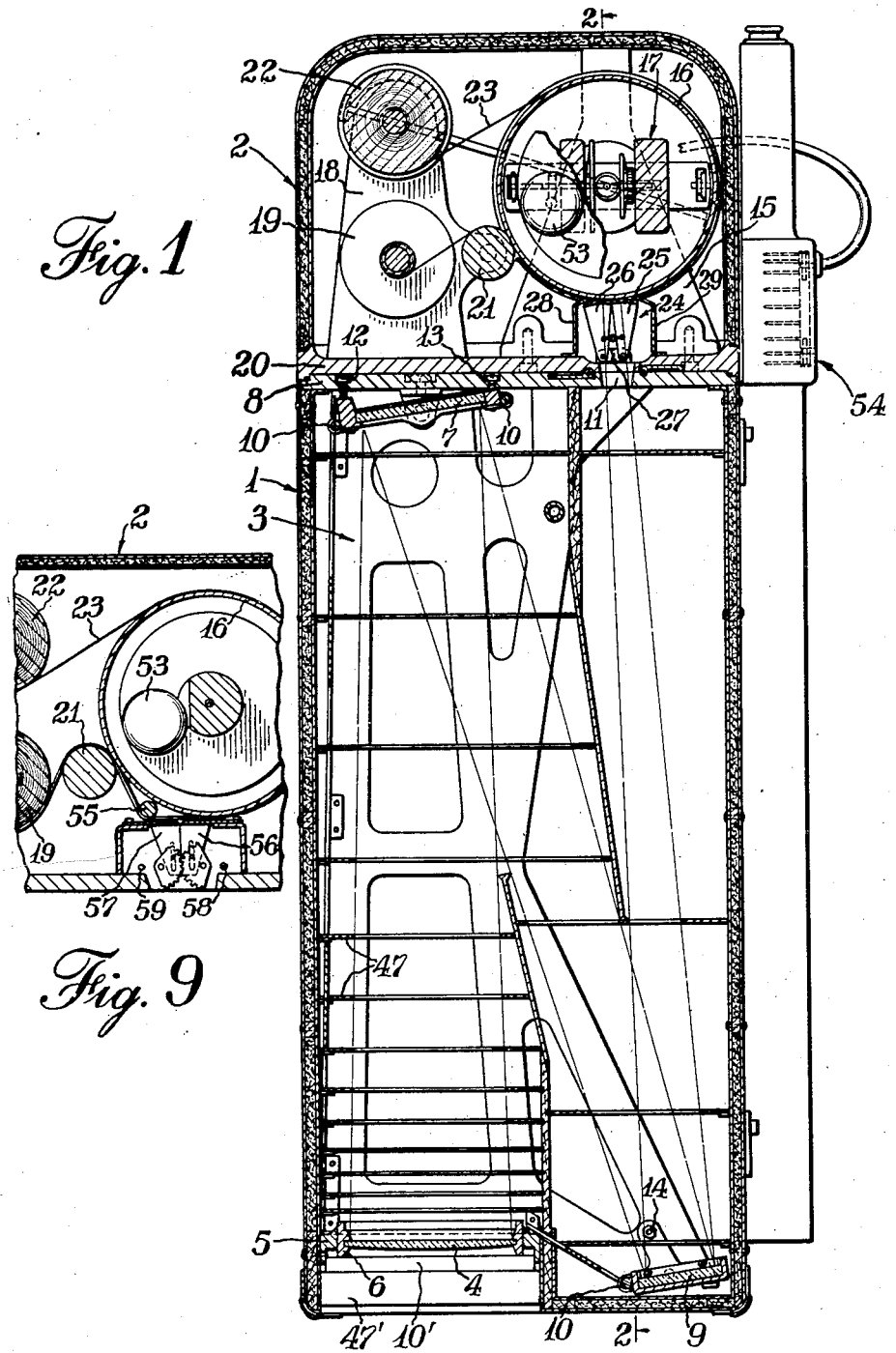
INVENTOR.
George E. Merritt
BY and Burr W. Jones
ATTORNEY

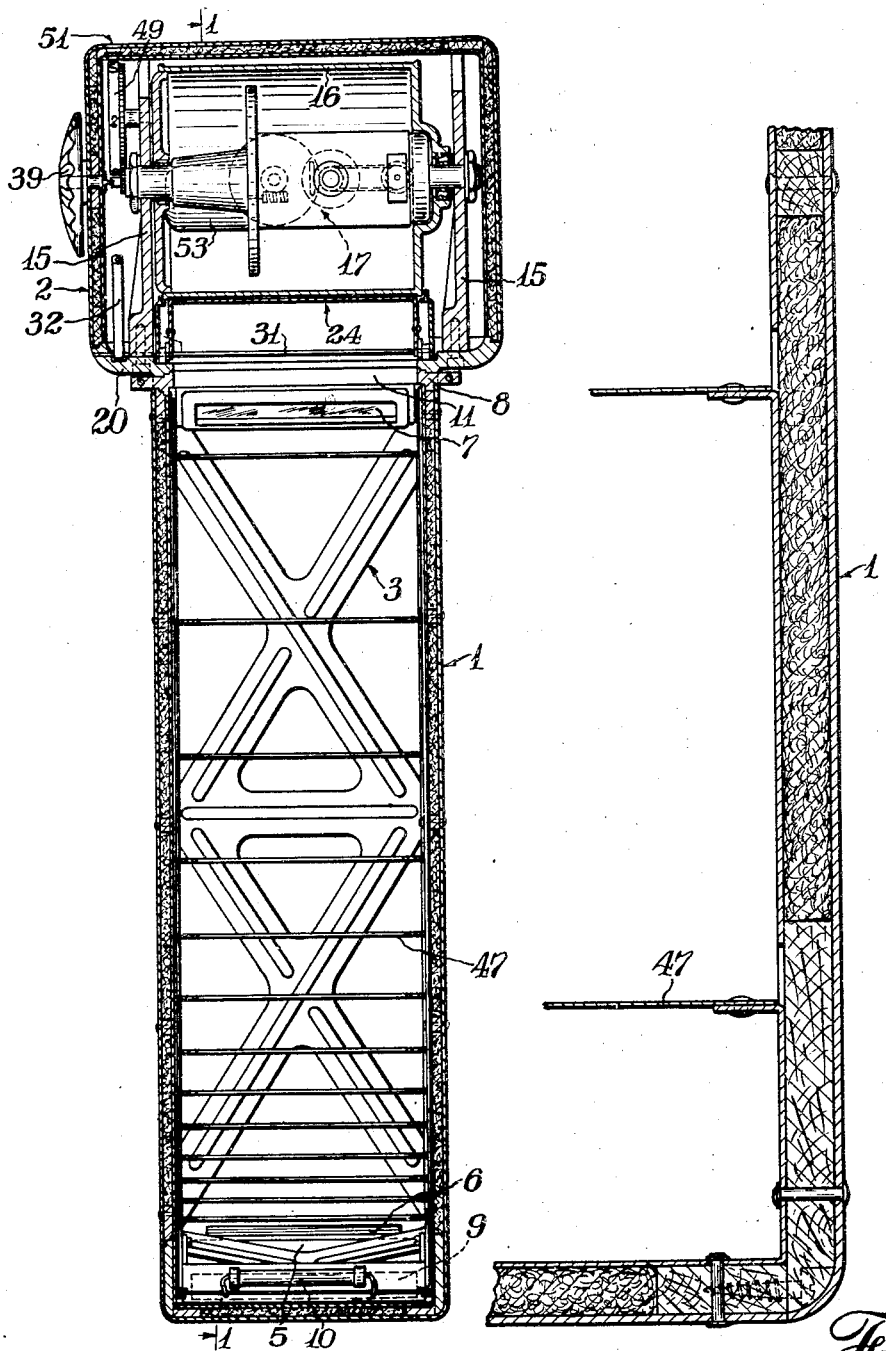

March 19, 1946.  G. E. MERRITT ET AL  2,397,031
CONTINUOUS STRIP CAMERA
Filed June 12, 1943  5 Sheets-Sheet 4

INVENTOR.
George E. Merritt
BY and Burr W. Jones
Clinton S. James
ATTORNEY

March 19, 1946.  G. E. MERRITT ET AL  2,397,031
CONTINUOUS STRIP CAMERA
Filed June 12, 1943  5 Sheets-Sheet 5

INVENTOR.
George E. Merritt
BY and Burr W. Jones
Clinton S. Janes
ATTORNEY

Patented Mar. 19, 1946

2,397,031

UNITED STATES PATENT OFFICE 2,397,031

CONTINUOUS STRIP CAMERA

George E. Merritt and Burr W. Jones, Elmira, N. Y., assignors to Bendix Aviation Corporation, South Bend, Ind., a corporation of Delaware Application June 12, 1943, Serial No. 490,654

14 Claims. (Cl. 95—12.5)

The present invention relates to a continuous strip camera for high altitude aerial reconnaissance, and more particularly to a fixed focus portable camera of this type using a very long focus lens.

Continuous strip cameras as presently known are used to obtain a continuous photographic record when there is a relative movement between the camera and the field of view or object. In order to substantially nullify the effect of such movement, the camera is provided with a magazine of roll film, and the film is guided into the focal plane of the lens and there moved continuously during exposure in a direction and at a speed substantially coordinated with the direction and speed of the image formed by the lens. The exposure of the film is controlled by providing a diaphragm in front of and adjacent to the film having a slot traversing the film normal to the direction of its movement, the width of the slot being adjustable to vary the exposure time.

Cameras of this type have been developed and used for low level aerial reconnaissance with success, but so far as applicants are aware no satisfactory continuous strip camera for high altitude aerial reconnaissance has been developed.

Various features have entered into this situation, including the fact that present types of long focus cameras for high altitude use are so heavy and bulky as to discourage the addition of any more structure; the fact that the advantages of this type of camera for such use are not generally appreciated; and the fact that problems of vibration, thermal expansion, drift correction, instability of flight, and atmospheric absorption of light were considered effective deterrents.

It is an object of the present invention to provide a novel strip camera for high altitude reconnaissance which is comparatively light and compact in construction and simple and economical to manufacture.

It is another object to provide such device incorporating means to reduce the effect of vibration of its carriage.

It is another object to provide such a device which is arranged to be substantially unaffected in operation by thermal expansion of its parts.

It is another object to provide such device having means enabling the operator to compensate continuously for speed variations, drift, side slip, etc.

It is a further object to provide such a camera in which the light path is folded or reflected back on itself a plurality of times so as to shorten the overall length of the camera to a fraction of the focal length of the lens.

It is another object to provide such a device in which the fact that the camera uses only a narrow strip of the field of view of the lens is utilized to reduce the major lateral dimension of the camera.

It is another object to provide such a device in which the arrangement of the film holders is such that the balance of the camera is substantially maintained irrespective of the reeling of the film from the storage spool to the exposed film spool.

It is another object to provide such a device in which the film is maintained substantially flat as it passes the exposure slot, without the use of sliding gates or guides or other extraneous holding means which might scratch the film.

Further objects and advantages will be apparent from the following description taken in connection with the accompanying drawings in which:

Fig. 1 is a vertical sectional view of a preferred embodiment of the invention taken substantially on the line 1—1 of Fig. 2;

Fig. 2 is a vertical section of the same taken at right angles to Fig. 1 and substantially on the line 2—2 of Fig. 1;

Fig. 3 is an enlarged detail in section of the camera housing showing the method of insulating the camera and of mounting the light baffles therein;

Fig. 9 is a detail of the film winding and adjustable slot mechanism showing the arrangement used when very wide slot openings are desired.

Figure 4:
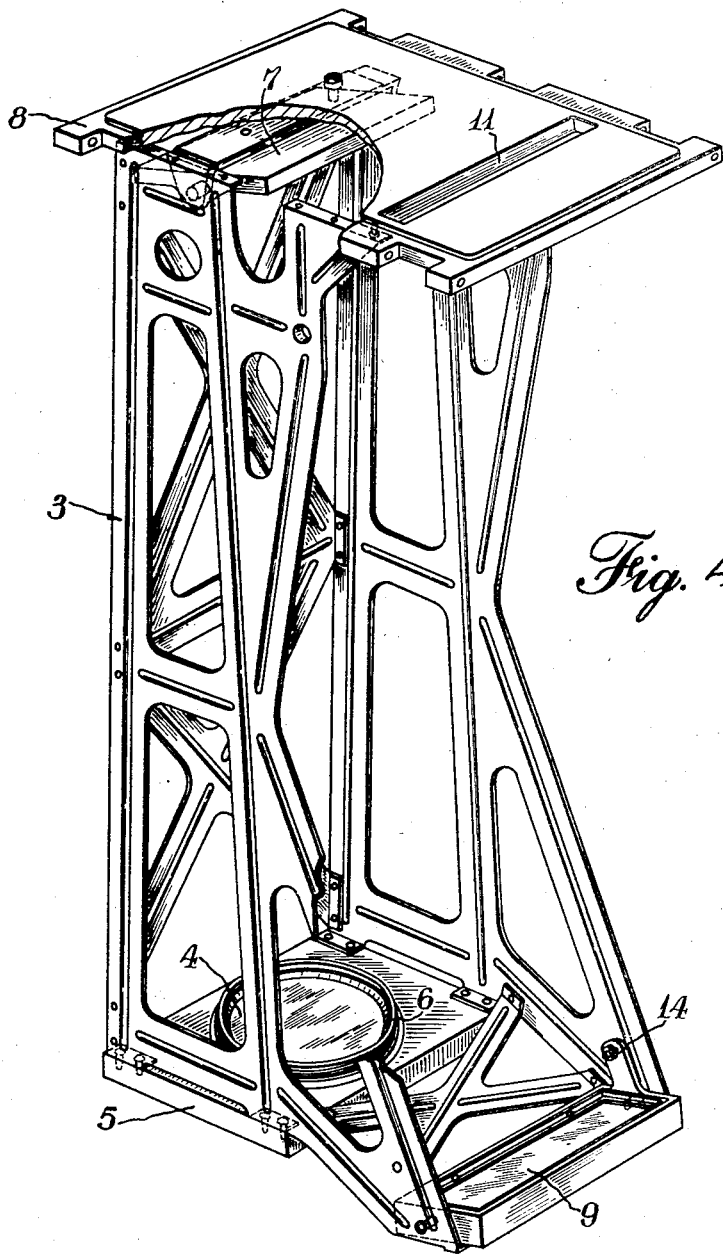
Fig. 4 is a perspective view of the camera frame showing the method of mounting the lens and mirrors.

In Fig. 1 of the drawings, there is illustrated a camera comprising a light-tight housing 1 containing the optical system, and a detachable light-tight cover 2 forming a chamber containing the film reeling mechanism and the adjustable slot device. A rigid mounting for the optical system within the housing 1 is provided in the form of a braced and reenforced frame 3, separate from the housing but rigidly attached thereto, having a lens board or plate 5 at the front end, and a back plate 8 at the rear which serves as a support for the film reeling and slot mechanism.

In order to reduce as much as possible the effect of vibration which may occur when the camera is carried in an airplane, the frame 3 is constructed as shown with lateral and longitudinal bracing so as to form a very rigid structure, the elements of which have high periods of natural free vibration. The housing 1 is formed of inner and outer sheet members which naturally have a comparatively low period of free vibration, and the space between the sheet members is filled as shown in Fig. 3 with a suitable wadding material such for instance as glass wool or asbestos which material acts as an effective vibration damper while also serving as thermal insulation for the housing. Since the frame 3 is attached rigidly to the housing as illustrated, it is obvious that the vibration of the frame is damped both by the wide difference in natural frequency of vibration between the frame and housing and also by the damping effect of the insulating material packed within the walls of the housing.

The material from which the frame 3 is constructed is so selected as to be light in weight and to have a thermal coefficient of expansion such as to substantially compensate for the variation in focal length of the camera lens due to temperature changes. It so happens that when crown glass is used for the lens and one of the common aluminum alloys for the frame, this compensatory effect is substantially secured. Rapid temperature changes are prevented by the insulation of the housing, and if it be desired to maintain constant internal temperature in the camera, this may be accomplished by installing suitable electrical heating units 10 within the housing so as to replace heat losses therefrom.

As best shown in Fig. 4 the optical system comprises a lens 4 mounted in the lens board 5, fixed in the front end of frame 3, preferably with provision for longitudinal adjustment as by means of a threaded cell mounting 6. A mirror 7 is mounted on the back plate 8 fixed on the rear end of the frame 3, the mirror being centered on the optical axis of the lens and being tilted slightly so as to cause the light impinging thereon to be reflected at a small angle. A second mirror 9 is mounted in the front end of frame 3, centered on the light beam reflected from the mirror 7 and so tilted as to return the light beam along a path substantially parallel with the optical axis of the lens. A narrow rectangular opening 11 is provided in the back plate 8 centered on the beam reflected from the mirror 9 and having a length slightly greater than the width of the film to be used in the camera, thereby permitting a band or strip of the reflected light beam to enter the film chamber. Means 12 and 13 for the mirror 7 and means 14 for the mirror 9 (Fig. 1) are preferably provided for adjusting said mirrors so as to center the reflected beam on the opening 11.

Means comprising a ring or grid of electrically heated wires 10' is preferably employed for maintaining the outer surface of the lens slightly warmer than the ambient temperature to prevent condensation of moisture thereon.

A supporting bracket 15 is rigidly mounted on a base plate 20 which has a detachable light-tight connection with the back plate 8 and is formed to receive the cover 2. Bracket 15 has journalled thereon a film drum 16, the axis of which is parallel with the longer dimension of the rectangular opening 11 and substantially centered with respect thereto, and the lower surface of which is tangent to the focal plane of the lens. In other words, the length of the light path from the rear nodal point of the lens to the nearest surface of the film drum is the same as the focal length of the lens so that the image of the field of view beyond the hyperfocal distance of the lens is focused on the surface of the drum. It will be understood that the lens 4 will be adjusted in its mount 6 to secure this result.

Means indicated generally by numeral 17 are provided for rotating the drum at speeds variable by the operator so as to enable the surface of the drum to move at the same speed as the image of the field of view when the camera is moved laterally in Fig. 1 with respect to the field of view. One form of rotating means for the drum is disclosed in detail in applicants' co-pending application, Serial Number 512,800, filed December 3, 1943, as a continuation in part of the present application.

A second mounting bracket member 18 is fixed to the base plate 20 and has journalled thereon on axes parallel to the axis of the drum 16, a film supply reel 19, a guide roller 21 and an exposed film reel 22. A film 23 is passed from the supply reel 19 over the guide roll 21, around the drum 16 and attached at its end to the exposed film reel 22 which latter is provided with any suitable form of take-up mechanism. Since the exposed film reel 22 is directly over the film supply reel 19, it will be obvious that the transfer of film from one reel to the other will merely raise the center of gravity of the camera slightly without throwing it out of balance.

Figure 7:
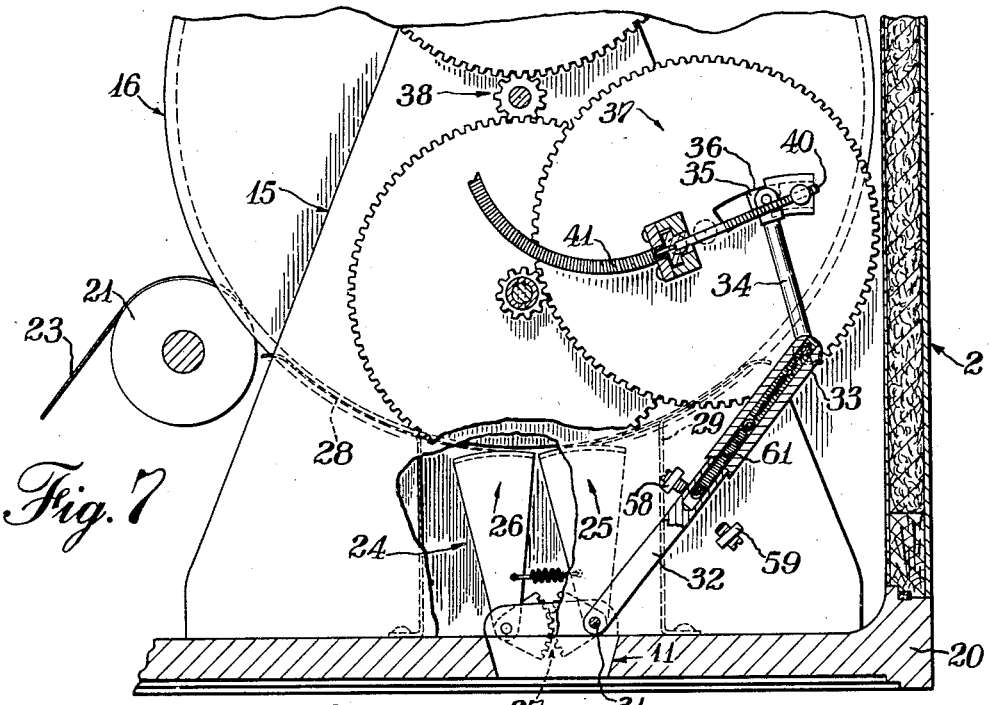
Fig. 7 is an enlarged detail partly in section showing the means for adjusting the width of the slot opening.

In order to control the exposure of the film, an adjustable slot mechanism indicated generally by numeral 24 is provided. As shown in Figs. 1 and 7 this mechanism comprises a pair of cylindrical sectors 25 and 26 pivoted to the base plate 20 on axes parallel to the axis of the drum 16, geared together as indicated at 27 so as to move equally in opposite directions and arranged directly over the rectangular opening 11 so that they control the passage of light from said opening on to the drum 16. Shields 28 and 29 are arranged to enclose the sectors 25, 26 and extend part way around the drum 16 in both directions from said sectors so as to prevent any light from striking the film 23 except that which passes between the sectors. The surfaces of the sectors are preferably arranged closely adjacent the surface of the film on the drum 16 so that the edges of the slot formed by the opening between the sectors will be sharply defined on the film.

Figures 8, 10:
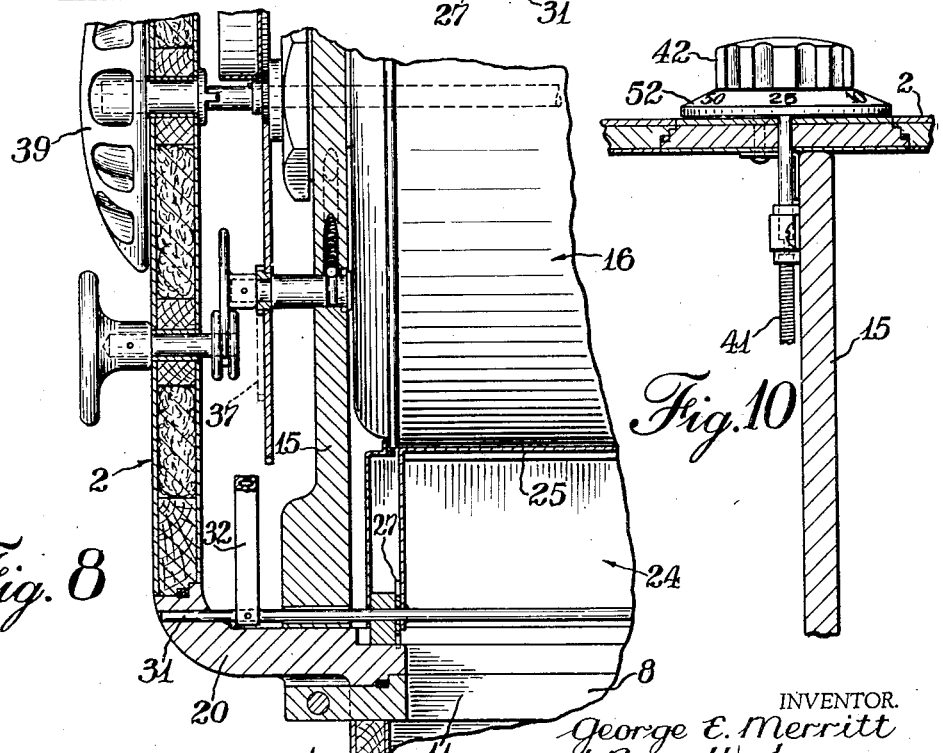
Fig. 8 is a similar view taken at right angles to Fig. 7 also illustrating the means for controlling the film speed.
Fig. 10 is a detail in side elevation, partly in section of the light-factor slot-control device.

When the rotation of the drum moves the film past the slot formed by the opening between the sectors 25, 26, the exposure of the film is obviously measured by the length of the time that any particular point on the film takes to traverse the width of the slot. It is clear therefore that the width of the slot must be adjustable to provide for two factors, namely the intensity of the light image formed by the lens, which is dependent upon the lighting of the field of view and the effective aperture of the lens, and secondly the rate of traversal of the film. In Figs. 7 and 8 there are illustrated means for conveniently securing the required adjustments of said sectors.

As there shown the sector 25 is provided with an extended axle 31 on which is fixed a crank arm 32, the free end of which is pivoted at 33 to one end of a link 34. The opposite end of the link 34 is pivoted to a block 35 slidably mounted in an arcuate guide 36 fixed on a gear 37 which gear is part of a gear train indicated generally by numerals 38 which is actuated by a hand wheel 39 (Fig. 8) to vary the speed of the driving mechanism 17 for the film drum 16. The rotary position of the gear wheel 37 is thus determined by the film speed adjusting means. The movement of the gear 37 corresponding to the entire range of speed adjustment of the film is preferably in the neighborhood of 45 degrees, and the dimensions and geometric relation of the film speed adjusting mechanism and the link and crank connection to the slot forming sectors are such that the width of the slot between the sectors is maintained directly proportional to the film speed. Thus, for example, if the width of the slot between the sectors is .020 of an inch when the speed of the film is one inch per second, the width of the slot will be .040 of an inch when the speed of the film is two inches per second.

Manually operable means for varying the width of the slot in accordance with the brilliance of the image formed by the lens without disturbing the direct proportion between the slot opening and film speed is provided as here shown by means of the adjustment of the pivot block 35 within the arcuate guide 36. Guide 36 is so formed that its center of curvature is the position occupied by the pivot 33 of the link 34 when gear 37 is rotated to such a position that sectors 25, 26 are completely closed. When in this condition, movement of the block 35 in arcuate slot 36 merely rotates the link 34 about its pivot 33 without imparting movement to the crank arm 32. However the distance of the block 35 from the center of the gear 37 determines the angular position of the crank arm 32 and, consequently the amount of the opening between the sectors 25, 26 which will be caused by rotation of the gear 37 to any particular film speed position. Any suitable means for adjusting the block 35 in the guide 36 is provided, such for instance as a threaded adjusting member 40 passing through the block and manually rotatable by means of a flexible shaft 41 from a knob 42 (Fig. 10).

The present camera is designed for a lens with a very long focal length such as in the order of 100 inches. It is obvious that when such a long focal length is used, the distances between the focal planes for the various colors of the spectrum are very considerable and likewise the difference between the focal length of the center and of the periphery of an uncorrected lens due to spherical abberation is quite large. With many types of glass now available, the achromatization of the lens in order to bring two or more of the primary spectral colors into the same focal plane prevents the securing of optimum conditions as to reduction of spherical abberation. Moreover attempts to secure such correction in a lens of this focal length result in an inordinately heavy and bulky lens embodying large amounts of special glasses which may be both expensive and difficult to obtain in required amounts. According to the present invention, applicants have obviated these difficulties by incorporating in the lens a light filter which is arranged to pass only substantially monochromatic light. Thus, the filter may for instance be arranged to obstruct all light having a shorter wave length than the red end of the spectrum. The red and infrared rays are particularly suitable for high altitude reconnaissance in view of their haze-penetrating ability and the fact that the remaining colors of the visible spectrum are prevented from reaching the film obviates the necessity for achromatization.

Figure 5:
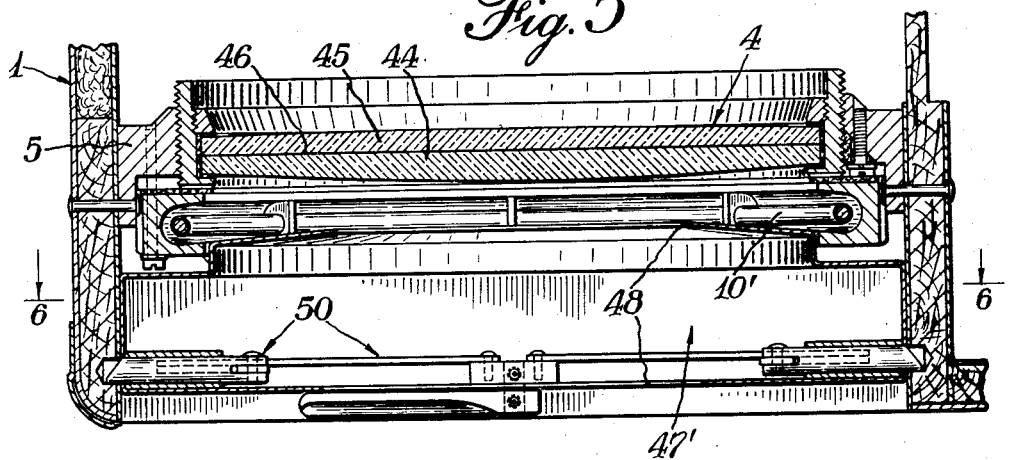
Fig. 5 is an enlarged detail of a portion of the camera housing and frame showing the lens mount and the demountable diaphragm member.

In order that the filter may be formed as an integral part of the lens, the lens is preferably formed as illustrated in Fig. 5 of two plano-convex glasses 44 and 45 with the filter 46 cemented between the adjacent plane surfaces of the elements. The filter may thus be of any conventional type, and is completely protected and sealed against injury or deterioration. Since the lens is not achromatic, it may be formed entirely of ordinary crown glass, and the curvature of the convex surfaces may be calculated to reduce spherical abberation to a minimum.

In view of the fact that only a narrow strip of the field of view of the lens is permitted to enter the film chamber and form the photographic record, the light beam from the lens is preferably narrowed down by means of baffles 47 having openings of graduated size mounted in the housing with such spacing as to prevent the light from the lens from impinging on the walls of the housing and being reflected therefrom so as to cause degradation of the image as impressed on the film. Advantage of this progressive narrowing of the light beam is taken to reduce to a minimum as shown in Fig. 1 the width of the camera housing. Since the thickness of the camera as shown in Fig. 2 need be only slightly greater than the width of the film to be used, while the height of the camera is reduced by virtue of the double reflection of the light path, this obviously makes a very small and compact camera in relation to the focal length of its lens.

When this camera is used for aerial reconnaissance, it is mounted in a suitable type of airplane in a vertical position and with the axis of the drum 16 anthwartships with respect to the airplane. The camera will of course be mounted on gimbals to provide for angular adjustment and so as to be capable of rotation around its longitudinal axis in order to compensate for side slip or drift of the airplane. Obviously the camera mount may be stabilized in any conventional manner if deemed desirable but since the mounting means forms no part of the present invention, it is deemed unnecessary to illustrate.

Figure 6:
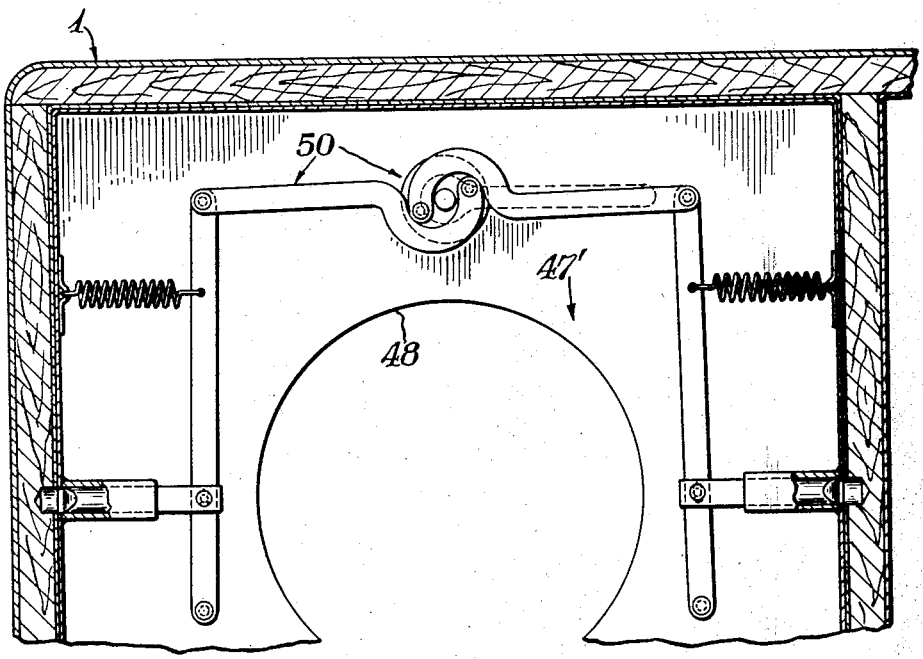
Fig. 6 is a section taken substantially on the line 6—6 of Fig. 5 showing the means for attaching the diaphragm member.

A combined lens shade and diaphragm member 47 is removably mounted in front of the lens and held in place by suitable retaining means such as indicated generally by numeral 50 (Figs. 5 and 6). It is intended that a plurality of such members having graduated openings 48 be provided and used selectively to secure a suitable aperture for the prevalent light condition and the intended use of the camera. It will be understood that the smallest diaphragm opening will be used which will give adequate exposure of the film with the expected film speed and slot opening. The drive gearing for the drum 16 is then adjusted by the hand wheel 39 to a value which corresponds with the speed and altitude at which it is intended to carry on the photographic reconnaissance. This figure will preferably be obtained by consulting a table such as the following whereby the film speed corresponding to any desired altitude and ground speed may be ascertained.

This table gives the film speed calculated for a lens of 96 inches focal length under various conditions of plane ground speed and altitude.

*Table of image speeds in inches/sec.*

| Altitude in feet | Speed of plane in mi./hr. | | | | | |
|---|---|---|---|---|---|---|
| | 150 | 200 | 250 | 300 | 350 | 400 |
| 10,000 | 2.11 | 2.82 | 3.52 | 4.22 | 4.93 | 5.63 |
| 15,000 | 1.41 | 1.88 | 2.35 | 2.82 | 3.28 | 3.75 |
| 20,000 | 1.06 | 1.41 | 1.76 | 2.11 | 2.46 | 2.82 |
| 25,000 | .84 | 1.13 | 1.41 | 1.69 | 1.97 | 2.25 |
| 30,000 | .70 | .94 | 1.17 | 1.41 | 1.64 | 1.88 |

For the purpose of convenient setting of film speed gearing a dial wheel 49 (Fig. 2) is geared to the adjusting shaft, and a viewing window 51 is provided in the cover 2 of the film chamber having a reference point for the scale engraved on the dial wheel.

The pivotal connection block 35 for the slot controlling link 34 is then adjusted in its guide 36 by means of the knob 42 to a position which provides the proper coordination between the film speed and slot opening for the light condition prevailing and the lens aperture and type of film used. For this purpose a dial wheel 52 is provided, which is geared to knob 42 and when used in conjunction with a fixed reference point indicates the adjustment of the link block 35. This adjustment corresponds to the setting of the shutter in an ordinary camera, so that the dial 52 may be conveniently calibrated directly in exposure times. The operator will then ascertain the proper exposure time by any of the usual methods such as by means of a light meter and will set the dial 52 in accordance therewith. For example, if with the kind of film used, a lens aperture of F16 and the light intensity prevailing, an exposure time of $1/50$ second is indicated, the dial 52 will be set at $1/50$. The geometry of the slot control is so designed that the slot width will then be .02 inch at a film speed of 1 inch per second; .04 inch at a film speed of 2 inches per second, etc., the same ratio being maintained however the film speed may be varied. After these adjustments have been made, and with a suitable red-sensitive photographic film mounted on the film reel 19 threaded around the drum 16 and attached to the exposed film reel 22, the camera is ready to operate.

The airplane is brought to the desired altitude adjacent the area to be reconnoitered and is, so far as possible, maintained in smooth level flight at the predetermined speed. When the plane approaches the target area, the driving motor 53 for the film drum is started and the film is thus moved past the slot formed by sectors 25, 26 at a speed which corresponds closely to the speed of the image of the target area caused by the motion of the plane with respect thereto. It will be understood, of course, that the ground speed will not correspond exactly to the air speed of the plane except in still air. However, since the air speed will ordinarily be many times greater than the air currents encountered, the errors introduced by the discrepancy between air speed and ground speed are for some purposes insignificant. If it be desired to secure continuously a very accurate correspondence between film speed and ground speed, a sighting device for the camera indicated generally by numeral 54 may be used having a comb or grid moving across its field of view at a speed corresponding with the film speed, and the film speed may be manually adjusted by the operator to maintain the film speed in precise consonance with the ground speed, the camera being rotated slightly in its mount if necessary to compensate for drift.

Since the film speed is maintained in close correspondence with the speed of the photographic image, it is obvious that slot openings of considerable widths may be used without introducing a significant amount of distortion or blur. While the radius of the film drum as illustrated is sufficiently great so that the convexity of the film lying on the drum is insignificant for moderate slot widths, it may under certain circumstances be desirable to use such wide slot widths that the departure of the film from the focal plane due to such convexity might be significant. Under such circumstances, a structure such as illustrated in Fig. 9 may be used in which the part of the film which is opposite the slot opening is maintained in tangential relation to the cylinder by a guide roller 55 so as to be held quite precisely in the focal plane throughout the width of the slot opening. In this modification, the slot members are formed as sliding diaphragm members 56, 57 instead of pivoted sectors 25, 26.

The maximum and minimum slot widths may conveniently be determined by adjustable abutments 58, 59 which limit the oscillation of the lever 32. The lever is preferably arranged with an elastic connection 61, which is arranged to permit movement of the link 34 after the lever 32 engages such stops in order to prevent damage to the mechanism.

Although certain structure has been illustrated and described in detail, it will be understood that other embodiments of the invention are possible and that various changes may be made in the design and arrangement of the parts illustrated without departing from the spirit of the invention as defined in the claims appended hereto.

What is claimed is:

1. In a high altitude reconnaissance camera a long focus lens and means for twice reflecting back on itself the beam of light traversing the lens and directing it through a slot onto a sensitized film, moving in a direction normal to the slot, said reflecting means being so arranged as to maintain the axes of the reflected portions of the beam substantially in the same plane with the axis of the lens, and said slot being substantially perpendicular to said plane a frame for rigidly supporting the lens, the reflecting means, the slot and the film in cooperating relation, and a light-tight enclosure for the frame fixed thereto and having a series of spaced light baffles rigidly mounted therein having rectangular openings of graduated size therethrough the length of said openings being substantially equal to the width of the film, and the width of the openings decreasing from the lens to the slot so as to taper the light beam down toward the shape of the slot, the frame and enclosure being substantially rectangular in cross section with the internal free dimensions substantially conforming to the overall dimensions of the reflected light beam.

2. A high altitude reconnaissance camera as set forth in claim 1 in which the light baffles act as stiffening means for the enclosure, and the enclosure is so constituted that its component parts have natural periods of vibration widely different from those of the elements of the frame.

3. A long range aerial reconnaissance camera adapted for use as a fixed focus camera, a long focus lens, means for twice reflecting the beam of light and directing it from the lens onto a sensitized film, and a frame for rigidly supporting the lens and one reflecting means at one end, and the other reflecting means and the film at the other end, the composition and structure of the lens and the frame being so designed that the change in focal length of the lens due to a temperature change is substantially three times the change of the length of the frame caused by said temperature change so as to maintain the film in the focal plane of the lens irrespective of temperature variations.

4. A long range aerial reconnaissance camera as set forth in claim 3 including further a light-tight heat insulating enclosure for the frame fixed thereto and cooperating therewith to form a non-vibratory support for the optical system of the camera.

5. In a high altitude reconnaissance camera, an optical system including a long-focus lens and means for directing the beam of light from the lens on to a sensitized film in the focal plane of the lens, variable speed mechanism for moving the film in consonance with the movement of the image of a field of view in said focal plane, diaphragm means in front of the film having a slot normal to the direction of movement of the film and symmetrical with respect to the axis of the light beam, and means for varying the width of the slot means connecting the variable speed mechanism to the means for varying the width of the slot while maintaining its symmetry with respect to the axis of the light beam, said connecting means being so arranged that variations in the speed of movement of the film cause directly proportional changes in the width of the slot.

6. A reconnaissance camera as set forth in claim 5 including further manually adjustable means for changing the ratio between the slot width and the film speed to compensate for variations in lighting conditions and effective lens apertures.

7. A reconnaissance camera as set forth in claim 5 including further means for reflecting the light beam back on itself while maintaining the axis of the beam in a plane passing through the center of the slot, baffle means for tapering the light beam down to the width of the slot, and rigid non-vibratory supporting and enclosing means for the optical system.

8. In an aerial reconnaissance camera an optical system for projecting an image of the field of view on a diaphragm having a slot, means for moving a sensitized film past the slot to expose the film, including a motor and continuously variable reduction gearing for connection the motor to move the film; manually operable means for adjusting the drive gearing so as to move the film in synchronism with the movement of the image of the field of view thereon caused by the movement of the camera relative to the field of view; and means actuated by the drive gear adjusting means for automatically varying the width of the slot in direct proportion to changes in speed of the film.

9. An aerial reconnaissance camera as set forth in claim 8 including further manually operable means for varying the ratio between the width of the slot and the speed of the film in accordance with the brilliance of the image produced by the lens.

10. In a high altitude reconnaissance camera a long focus lens, and means for reflecting the beam of light traversing the lens and directing it onto a sensitized film, a frame for rigidly supporting the lens, the reflecting means and the film in cooperating relation comprising lateral and longitudinal braces having a high frequency of natural free vibration, and a light-tight housing for the frame fixed thereto comprising sheet members having a comparatively low frequency of free vibration and means for attaching the sheet members rigidly to the frame so as to cooperate to form a self damping support and enclosure for the lens and reflecting means.

11. A high altitude reconnaissance camera as set forth in claim 10 in which the elements of the housing are formed of inner and outer sheet members with fibrous wadding material therebetween to damp vibrations and to thermally insulate the housing.

12. In an aerial reconnaissance camera, a long focus lens, a light-tight housing having baffle means for tapering down the light beam from the lens to a long narrow rectangle, and diaphragm means forming a slot symmetrically located in said rectangle, means for continuously traversing a photo-sensitive film back of said slot, in a direction normal to its length, means for twice reflecting the light beam to fold it back on itself and direct it onto the slot, the angles of such folds being parallel to the slot, a rigid skeleton frame within the housing supporting the lens, reflecting means and film traversing means, the members of the frame being so formed as to have high frequencies of natural free vibration, the elements of the housing being formed to have comparatively low frequencies of free vibration, and means for attaching the elements of the housing to the frame to cooperate therewith to form a non-vibratory structure.

13. An aerial reconnaissance camera as set forth in claim 12 in which the angles of reflection of the light beam are so acute as to bring the final portion of the light beam into approximate parallelism with the first portion of the beam and closely adjacent thereto.

14. An aerial reconnaissance camera as set forth in claim 12 in which the angles of reflection of the light beam are so acute as to bring the final portion of the light beam into approximate parallelism with the first portion of the beam and closely adjacent thereto and in which the skeleton frame conforms closely to the folded and flattened shape of the light beam.

GEORGE E. MERRITT.
BURR W. JONES.